April 18, 1967 H. MENDELSON 3,314,739

CARRYING CASE

Filed Feb. 20, 1964

INVENTOR.
HANS MENDELSON
BY Eugene M. Whitacre
Attorney

United States Patent Office 3,314,739

Patented Apr. 18, 1967

3,314,739

CARRYING CASE

Hans Mendelson, Indianapolis, Ind., assignor to Radio Corporation of America, a corporation of Delaware Filed Feb. 20, 1964, Ser. No. 346,331
7 Claims. (Cl. 312—8)

This invention relates to a carrying case for portable record players and more particularly to a carrying case for a tilt-down variety of portable record players.

In the design of carrying cases for portable record players it is desirable to have the overall appearance of a small suitcase with an accessible handle for transportation, and at the same time include a simple means for placing the player into position for operation. The tilt-down variety of portable record players are put into operation by setting the case on end with the carrying handle up and swinging or tilting down the player portion into a horizontal position. In this type of record player the cover portion serves as an upright stand for the player portion which extends horizontally outward from the cover.

Previous designs for such tilt-down record players used a substantially rectangularly shaped player mechanism mounting base. The base, when in the closed carrying position, would comprise one side of the carrying case. This rectangularly shaped type of base introduced problems in selecting the pivot point about which the base could pivot. The base portion which contains the record player mechanism is adapted to pivot down and extend in a cantilever fashion from the cover. As a result the location of the pivot point is controlled by a number of design requirements such as weight distribution and center of gravity of the base in the closed and open positions, the overall appearance of the carrying case, etc.

With a rectangularly shaped case, the pivot point between the two case portions had to be sufficiently high on the upright cover portion to provide suffcient clearance for passage of the corner of the base as the base portion of the case is pivoted down. Thus, the base portion of the case extends at right angles from the cover portion with the only support means for the base comprising the mounting in the cover.

Under these conditions, the record player mounted in the base member is designed so that its center of gravity is adjacent the pivot point to increase the stability of the unit. This requires redesign of existing record player mechanisms. Furthermore, if used with an automatic changer, the instability problems increase as the number of records placed upon the selection spindle is increased. In some cases protruding or retractable legs are added to increase stability.

Furthermore, a tilt-down record player when closed, should have its center of gravity so concentrated so as to keep the case closed. . This prevents an accidental drop-down when the latch is unexpectedly opened.

It is therefore an object of this invention to provide a low cost, compact tilt-down portable record player carrying case with improved stability.

It is a further object of this invention to provide a low cost, compact portable record player carrying case designed to resemble a small suitcase.

It is also an object of this invention to provide a new and improved tilt-down portable record player carrying case whereby the tilt-down portion can form a part of the stable support means without need of a protruding or retractable support leg.

It is still a further object of this invention to provide a new and improved carrying case for a tilt-down portable record player whereby the tilt-down portion forms a part of a stable support means so that no weight balancing is necessary in the design of the tilt-down portion, nor will the number of records placed upon its spindle have any effect on its stability.

The carrying case of the present invention is a low cost, compact carrying case large enough to house the mechanism and associated equipment of a portable record player. The case of the invention primarily includes two main portions, a base member and a cover member, each portion being shaped to produce an overall appearance of a small suitcase. The base member is substantially a mounting frame for the record player mechanism and associated equipment.

The base and cover member portions are pivotally joined so that the cover member serves as an upright stand in which the base member may be pivoted between an open (tilt-down) and a closed (carry) position. The bottom edges to the base and cover members are rounded so as to be in roughly concentric relation when the base member is pivoted to the open position.

When the instrument is placed on a supporting surface, such as a table, the base member can assume two stable positions. In one stable position (the tilt-down play position) the base member is horizontal, forming a part of the support means along with the cover. In the second stable position the base is in a closed postion (substantially vertical) with the center of gravity of the base positioned to keep the case closed. This prevents the accidental drop-out of the base when the case latch is opened.

An additional feature of the invention is to incorporate a small protruding foot as an integral portion of the base member as the support means for the base when in the tilt-down position, wherein this same foot includes ventilation holes for efficiently permitting cooling air flow into the base portion of the carrying case without detracting from the overall carrying case appearance.

The novel features which are considered to be characteristic of this invention are set forth in particularity in the appended claims. The invention itself, however, both as to organization and method of operation will best be understood from the following description when read in connection with the accompanying drawings in which:

Figure 1:
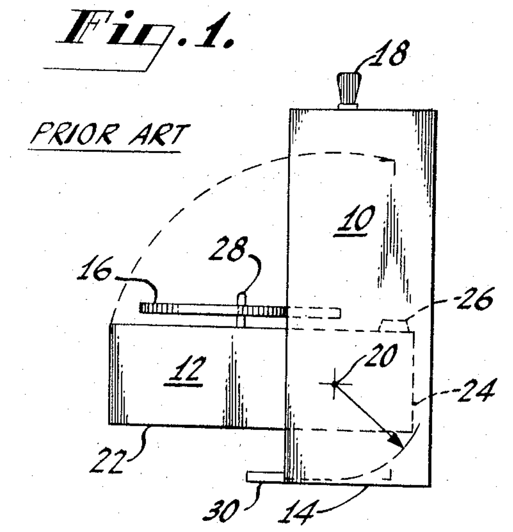
FIGURE 1 is a side view of a typical tilt-down portable record player of the prior art.

In referring to the drawings, the like elements and parts are designated by like reference characters throughout the figures. FIGURE 1 is an illustration of the type of tilt-down portable record player carrying cases presently in public use. This type of carrying case mainly comprises two major components, a cover 10 and a base 12. The cover 10 has an attached carrying handle 18 providing a means by which the portable record player can be easily transported. When in use or in storage, the record player is designed to set on a flat surface or stand 14, a portion of cover 10. The base 12 houses the usual record player mechanism 16 and its associated equipment, and is pivotally mounted in the cover 10 through the pivot or bearings 20. The base 12, as shown in FIGURE 1, is in the tilt-down play position, but it is also able to rotate from this position about the pivot point 20 into the cover 10, to a carrying position. The path of rotation is designated by the dashed lines. The flat surface 22 of base 12 forms a side of the case while in the carry position whereby the entire case will substantially resemble a small suitcase.

With the rectangular base as shown in FIGURE 1, clearance must be provided to allow a corner 24 of base 12 to swing through its arc of rotation without being obstructed. This additional clearance results in suspending the base 12 while in the horizontal play position without any support for the base other than the bearing 20 and a stop 26 in the cover 10. The stop 26 limits the rotation of the base 12 to a horizontal position parallel to the surface 14.

As a result, in order to stabilize the record player in a tilt-down position it is desired to design the center of gravity of the base as far back toward the pivot point 20 as possible. This may entail the redesign of existing turntable mechanisms. In addition, it is also desired that a spindle 28 of the mechanism 16 be placed as close to the pivot point 20 as possible so that the additional weight of the records will not substantially affect the record player stability. This latter requirement may require increasing the size of the cover 10 which may be undesirable from appearance considerations.

Figure 2:
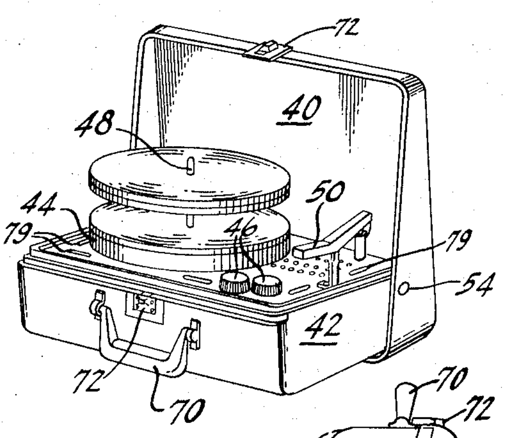
FIGURE 2 is a perspective view of a portable phonograph embodying the invention.

FIGURE 2 is a perspective view illustrating the use of the carrying case embodying the invention to incase a typical record player mechanism and its associated equipment. This carrying case has two main elements, a cover member 40 and a base member 42. The player mechanism and its associated equipment is mounted in the base member 42, which in the present example, includes a turntable 44, controls 46, spindle 48 and a pickup arm 50, with the amplifier, speaker, etc., mounted within the base. The entire assembly as shown is in the tilt-down play or operate position.

Figures 3, 4, 5, 6, 7, 8:
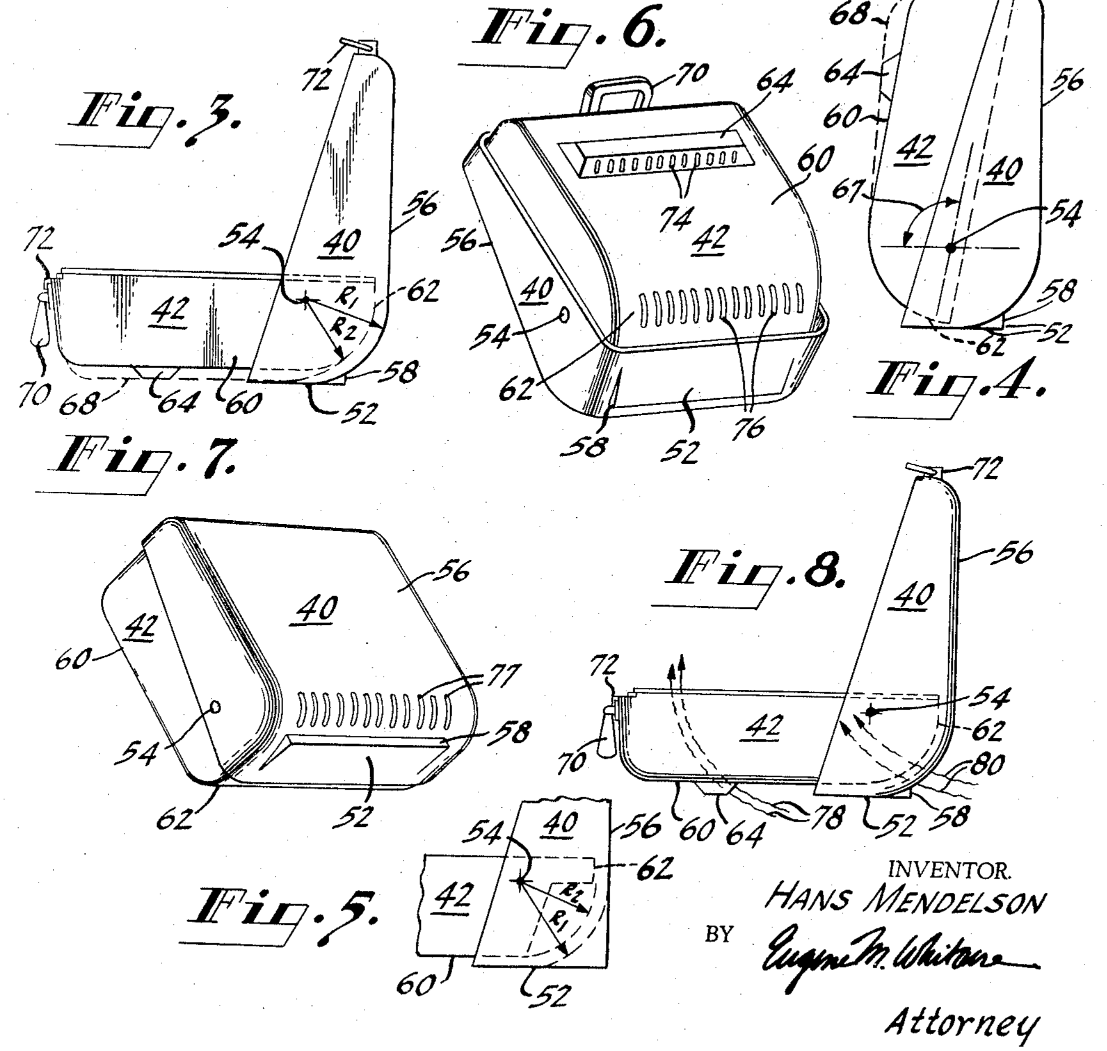
FIGURE 3 is a side view of the carrying case of FIGURE 2 in the tilt-down position.
FIGURE 4 is a side view of the carrying case of FIGURE 2 in the carrying position.
FIGURE 5 is a partial view of the carrying case embodying the invention showing a modification.
FIGURE 6 is a perspective view of the carrying case of FIGURE 2 illustrating the ventilation features in the base portion of the carrying case.
FIGURE 7 is a perspective view of the carrying case of FIGURE 2 illustrating the ventilation features in the cover portion of the carrying case.
FIGURE 8 is a side view of the carrying case in the tilt-down position illustrating the flow of ventilation currents.

FIGURE 3 is a side view of the carrying case in the tilt-down position. The cover member 40 is placed on its flat surface or stand portion 52, forming an upright stand. The base member 42 is pivotally mounted in the cover 40 through a set of pivot or bearing pins 54 for rotation between an open tilt-down position (FIGURE 3) and a closed carry position (FIGURE 4). In the carry position (FIGURE 4) the surface 52 is the sole means of support for the record player. In the tilt-down position (FIGURE 3), the base member 42 swings down to form a part of the case support means.

The corner formed by the base bottom wall or surface 62 and its adjacent side panel or surface 60, as viewed in FIGURE 4, is rounded so as to form an arc of a circle with its center point at the pivot point 54. $R_2$ (FIGURES 3 and 5) designates the radius of this arc. The inner surfaces of bottom wall or surface 52 and the side surface 56 of the cover member 40, as viewed in FIGURE 4, are also rounded at the corner where they join so as to be in roughly concentric relation to the base member 42 when the base member 42 is pivoted to the open tilt-down position of FIGURE 3. $R_1$ designates the radius of the arc of the inner surface of the cover member 40 and also has its center point at the pivot point 54. The difference in length between $R_1$ and $R_2$ is the amount allotted for rotational clearance between the base and cover members.

In the present example (FIGURE 3) the base member wall surface 62 is completely formed into the shape of an arc. The shape of the surface 62 and its adjacent surface 60 may be modified into any shape (as shown by the dashed line of FIGURE 5) as long as the modification does not extend beyond the distance $R_2$. The cover member 40 can also assume any shape (FIGURE 5) as long as the inner dimension ($R_1$) of the cover allows for a sufficient radius of clearance.

A small projecting foot 64 can be formed as an integral part of the panel 60 to compensate for the difference between $R_1$ and $R_2$ and the thickness of surface 52 thereby serving as a support for the base 42 without detracting from the overall appearance since its projecting dimension (vertical dimension as viewed in FIGURE 3) can be less than a half inch. The need for the foot 64 can be eliminated by modifying the panel 60 to assume the shape of the dashed line 68 as shown in FIGURES 3 and 4.

With the carrying case configuration as shown in FIGURE 3, the base member 42 and the cover member 40 form a stable support for the portable record player in a tilt-down position. A major portion, the weight of the base member 42 is actually carried by itself rather than depending entirely upon the cover for its support. Any standard record player mechanism can be incorporated into the case along with its associated equipment, and located wherever convenient without affecting the record player stability. Furthermore, any number of records can be placed upon the spindle 48 or upon the turntable 44 without affecting the case stability.

A carrying case handle 70, in the present example, is attached to the base member 42. When the carrying case is in a carrying position (FIGURE 4), handle 70 serves as a standard grip. When swinging or tilting the base member 42 down to the horizontal tilt-down play position, the handle serves as a convenient grip to control the rate of descent of the base member 42.

Portions of a standard type latching device or lock 72 are mounted on the cover member 40 and the base member 42. The latch 72 keeps the case closed while being transported in the carrying position (FIGURE 4). The angle of rotation 67 (FIGURE 4) of the base member 42 is greater than 90°. This enables the base 42 to rotate from the tilt-down horizontal position, beyond a vertical position, to carry position thereby placing the center of gravity of the base into the cover member 40 to the right of the pivot point 54 as viewed in FIGURE 4. By locating the center of gravity to the right of the pivot point (FIGURE 4) the accidental drop-out of the base member 42 is prevented when the case is unlatched.

The projecting foot 64 serves a secondary purpose by providing for a means of including ventilation into the forward or handle portion of the base member 42 without detracting from the case appearance. As shown in FIGURE 6, a series of ventilation holes 74 are incorporated into the side of the foot 64 that faces down when in the carrying position. These ventilation holes 74 can not be readily seen in either the tilt-down play position or in the carrying position.

Further ventilation is provided in the carrying case without detracting from its overall appearance by including a number of ventilation holes 76 in the curved or arced portion of the base member 42 (FIGURE 6) and further ventilation holes 77 in the curved or arced portion of the cover member 40 (FIGURE 7). The ventilation holes 76 and 77 also are not readily seen when in the carrying position. In the tilt-down position the ventilation holes 76 and 77 of the base member 42 and the cover member 40 become aligned allowing the passage of air through the base.

FIGURE 8 illustrates the ventilation paths in the base member 42. The arrows 78 indicate the ventilation path in the forward portion of the base member 42 by the use of vent holes 74 in the foot 64, while the arrows 80 indicate the ventilation path in the rear of the unit through the aligned vent holes 76 and 77. The cool air admitted to the base 42 absorbs heat from the amplifier circuit and turntable motor and rises through aperture 79 in the motorboard. Thus, a continuous air flow is maintained to efficiently cool the amplifier contained in the base portion.

The carrying case as shown in FIGURES 2–8 is made with large radii throughout. This enables the use of plastic vacuum forming or molding process in the manufacture of this carrying case thereby producing a low cost, light weight carrying case.

From the foregoing description it can be seen that the carrying case embodying the invention provides an extremely stable, light weight, low cost, carrying case for tilt-down portable record player with an overall appearance of a small suitcase. The combination portable record player and carrying case has two stable positions, one being carrying position and the other the tilt-down position. Since the base in the tilt-down position is capable of supporting a major portion of its own weight, any standard record player mechanism can be incorporated into the base without any allowance for weight redistribution. Furthermore, provisions for ventilation can be incorporated into the case without substantial affect upon its overall suitcase type appearance.

What is claimed is:

1. A carrying case for a portable record player comprising:
first and second members providing respectively the front and rear portions of said case;
said first member being pivotally mounted in said second member for movement from a closed position wherein said first and second members cooperate to provide a substantially closed casing for said record player, to an open position wherein said first member extends generally horizontally and said second member is generally vertically disposed;
the front and rear bottom edges of said first and second members being rounded so that the rounded portion of said first member moves into substantially concentric relation within the rounded portion of said second member when said first member is moved to said open position;
a foot formed as an integral part of said first member, said foot forming a support means for said case when said case is in the open position; and
said foot being formed with a plurality of holes on the surface facing down when said case is in the closed position, whereby said foot provides an efficient means for ventilating said case.

2. A carrying case for portable record players comprising:
first and second members providing respectively the front and rear portions of said case;
said first member being pivotally mounted in said second member for movement from a closed position to an open position wherein said first member extends generally horizontally and said second member is generally vertically disposed;
the front and rear bottom edges of said first and second members being rounded so that the rounded portion of said first member moves into substantially concentric relation within the rounded portion of said second member when said first member is moved to said open position; and
said first and second members formed with a plurality of openings in said first and second member rounded edges to provide a means for ventilating said case.

3. A carrying case for a portable record player comprising:
first and second members providing respectively the front and rear portions of said case;
said first member being pivotally mounted in said second member for movement from a closed position to an open position wherein said first member extends generally horizontally and said second member is generally vertically disposed;
the front and rear bottom edges of said first and second members being rounded so that the rounded portion of said first member moves into substantially concentric relation within the rounded portion of said second member when said first member is moved to said open position; and
said first and second members formed with a plurality of openings in said first and second member rounded edges so that the plurality of openings become aligned when said first member is rotated into the open position providing a means to ventilate said case.

4. A carrying case for a portable record player comprising:
first and second members providing respectively the front and rear portions of said case;
said first member being pivotally mounted in said second member for movement from a closed position to an open position wherein said first member extends generally horizontally and said second member is generally vertically disposed;
the front and rear bottom edges of said first and second members being rounded so that the rounded portion of said first member moves into substantially concentric relation within the rounded portion of said second member when said first member is moved to said open position;
a foot formed as an integral part of said first member, said foot forming a support means for said case when said case is in the open position;
said foot formed with a plurality of holes on the surface facing down when said case is in the closed position, said foot providing an efficient means for ventilating said case; and
said first and second members formed with a plurality of openings in said first and second member rounded edges so that the plurality of openings become aligned when said first member is rotated into the open position providing a second means for ventilating said case in the open position.

5. A carrying case for portable record players comprising:
first and second members providing respectively the front and rear portions of said case;
said first member being pivotally mounted in said second member for movement from a closed position to an open position wherein said first member extends generally horizontally and said second member is generally vertically disposed;
the front and rear bottom edges of said first and second members being rounded to that the rounded portion of said first member moves into substantially concentric relation within the rounded portion of said second member when said first member is moved to said open position;
a foot formed as an integral part of said first member, said foot forming a support means for said case when said case is in the open position;
said foot formed with a plurality of holes on the surface facing down when said case is in the closed position, said foot providing an efficient means for ventilating said case;
said first and second members formed with a plurality of openings in said first and second member rounded edges so that the plurality of openings become aligned when said first member is rotated into the open position providing a ventilation for said case; and
a motorboard on said first member providing a mounting means for a record player mechanism and associated equipment, said motorboard being formed with a plurality of openings providing a ventilation path to said formed openings in said foot and rounded edges to cool said record player mechanism and associated equipment.

6. A carrying case for a portable record player comprising:
first and second members providing respectively the base and the cover portions of the case;

each of said first and second members having a side surface and four walls extending therefrom forming a box shaped structure formed with an opening;
said second member having larger dimensions than said first member;
said first member being pivotally mounted in said second member for movement from a closed position wherein both first and second members are generally vertically disposed and in which said first member substantially covers the opening in said second member, to an open position wherein said first member extends generally horizontally and said second member remains generally vertically disposed;
the pivot mounting on said first member being located substantially equidistant from said first member side surface and a first member wall;
the pivot mounting on said second member being located substantially equidistant from said second member side surface and a second member wall;
the junction between said first member side surface and said first member wall and the remainder of said first member wall being shaped within an arc of a circle, said arc having a radius with its center point at said first member pivot mounting and its length being the distance from said pivot mounting to the closest point on said first member surface;
the inner surface of the junction of said second member side surface and said second member wall being shaped beyond an arc of a circle, said arc having a radius with its center point at said second member pivot mounting and its length greater than said radius on said first member;
a foot formed as an integral part of said first member, said foot forming a support means for said case when said case is in the open position; and
said foot being formed with a plurality of holes on the surface facing down when said case is in the closed position whereby said foot provides an efficient means for ventilating said case.

7. A carrying case for a portable record player comprising:
first and second members providing respectively the base and the cover portions of the case;
each of said first and second members having a side surface and four walls extending therefrom forming a box shaped structure formed with an opening;
said second member having larger dimensions than said first member;
said first member being pivotally mounted in said second member for movement from a closed position wherein both first and second members are generally vertically disposed to an open position wherein said first member extends generally horizontally and said second member remains generally vertically disposed;
the pivot mounting on said first member being located substantially equidistant from said first member side surface and a first member wall;
the pivot mounting on said second member being located substantially equidistant from said second member side surface and a second member wall;
the junction between said first member side surface and said first member wall and the remainder of said first member wall being shaped within an arc of a circle, said arc having a radius with its center point at said first member pivot mounting and its length being the distance from said pivot mounting to the closest point on said first member surface;
the inner surface of the junction of said second member side surface and said second member wall being shaped beyond an arc of a circle, said arc having a radius with its center point at said second member pivot mounting and its length greater than said radius on said first member;
a foot formed as an integral part of said first member, said foot forming a support means for said case when said case is in the open position;
said foot being formed with a plurality of holes on the surface facing down when said case is in the closed position whereby said foot provides an efficient means for ventilating said case; and
said first and second members being formed with a plurality of openings in said shaped portions of said junctions of said first and second members, said plurality of openings becoming aligned when said first member is rotated into the open position providing a second means ventilating said case in the open position.

References Cited by the Examiner

UNITED STATES PATENTS

| | | | |
|---|---|---|---|
| Re. 85,280 | 10/1931 | Brooks. | |
| D. 152,710 | 2/1949 | Louchheim. | |
| 1,487,433 | 3/1924 | Beckert | 206—1 |
| 1,827,929 | 10/1931 | Bigelow. | |
| 1,981,016 | 11/1934 | Wooddell | 312—213 |
| 2,124,194 | 7/1938 | Herzig | 312—8 X |
| 2,403,825 | 7/1946 | Nissenbaum | 206—45.15 X |
| 2,479,725 | 8/1949 | Casas-Robert | 312—208 X |

FOREIGN PATENTS

| | | |
|---|---|---|
| 133,722 | 11/1951 | Sweden. |

CLAUDE A. LE ROY, *Primary Examiner.*

A. FRANKEL, *Assistant Examiner.*